United States Patent
Liu

(10) Patent No.: US 8,628,156 B2
(45) Date of Patent: Jan. 14, 2014

(54) COMPUTER CASE

(75) Inventor: Lei Liu, Shenzhen (CN)

(73) Assignees: Hong Fu Jin Precision Industry (ShenZhen) Co., Ltd, Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 142 days.

(21) Appl. No.: 13/220,684

(22) Filed: Aug. 30, 2011

(65) Prior Publication Data

US 2012/0285848 A1 Nov. 15, 2012

(30) Foreign Application Priority Data

May 9, 2011 (CN) .......................... 2011 1 0117147

(51) Int. Cl.
*A47B 81/00* (2006.01)
(52) U.S. Cl.
USPC ...................................................... 312/223.2
(58) Field of Classification Search
USPC ........................................... 312/223.1, 223.2
See application file for complete search history.

(56) References Cited

U.S. PATENT DOCUMENTS

| 5,587,877 | A | * | 12/1996 | Ryan et al. | ................. | 361/679.6 |
| 7,855,881 | B2 | * | 12/2010 | Tsai et al. | ................ | 361/679.37 |
| 2005/0135069 | A1 | * | 6/2005 | King et al. | .................... | 361/727 |

FOREIGN PATENT DOCUMENTS

| TW | 446140 | 7/2001 |
| TW | 515632 | 12/2002 |

* cited by examiner

Primary Examiner — Matthew Ing
(74) Attorney, Agent, or Firm — Altis Law Group, Inc.

(57) ABSTRACT

A computer case includes a housing, a first sub housing, and a second sub housing. The housing includes a bottom wall, a sidewall and a fixing wall extending perpendicularly from the bottom wall, all of which cooperate to form a receiving space. The first sub housing is configured for receiving a redundant power supply. The second sub housing is configured for receiving a single power supply. Each of the first sub housing and the second sub housing is capable of being detachably received in the receiving space and secured to the housing.

6 Claims, 4 Drawing Sheets

COMPUTER CASE

BACKGROUND

1. Technical Field

The present disclosure relates to a computer case.

2. Description of Related Art

Computers include power supplies mounted in computer cases. The power supplies include single power supply and redundant power supply which are different in size and structure. The mountings in computer cases can only receive the particular power supply, single or redundant, for which they are built. If it is desired to replace either kind with the other, the computer case must also be replaced.

Therefore, it is desirable to provide a computer case, which can overcome the limitations described.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION

Figure 1:
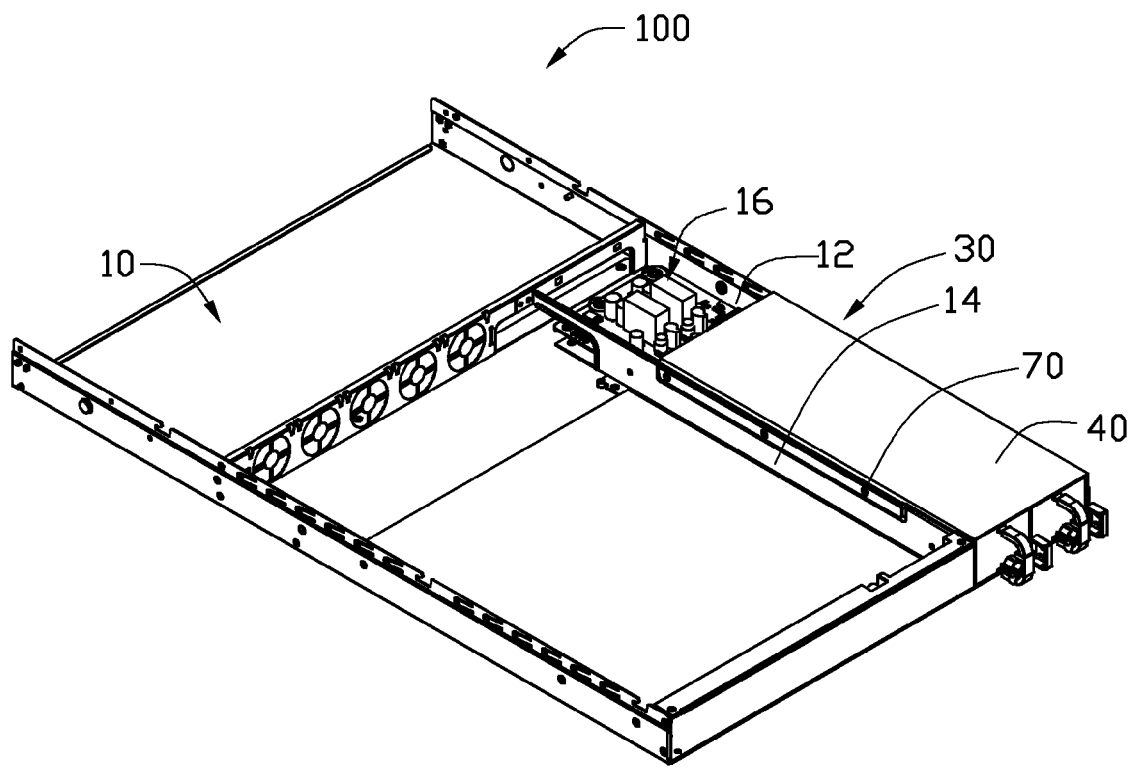
FIG. 1 is a schematic, isometric view of a computer case with a redundant power supply according to an embodiment of the present disclosure.
Figure 2:
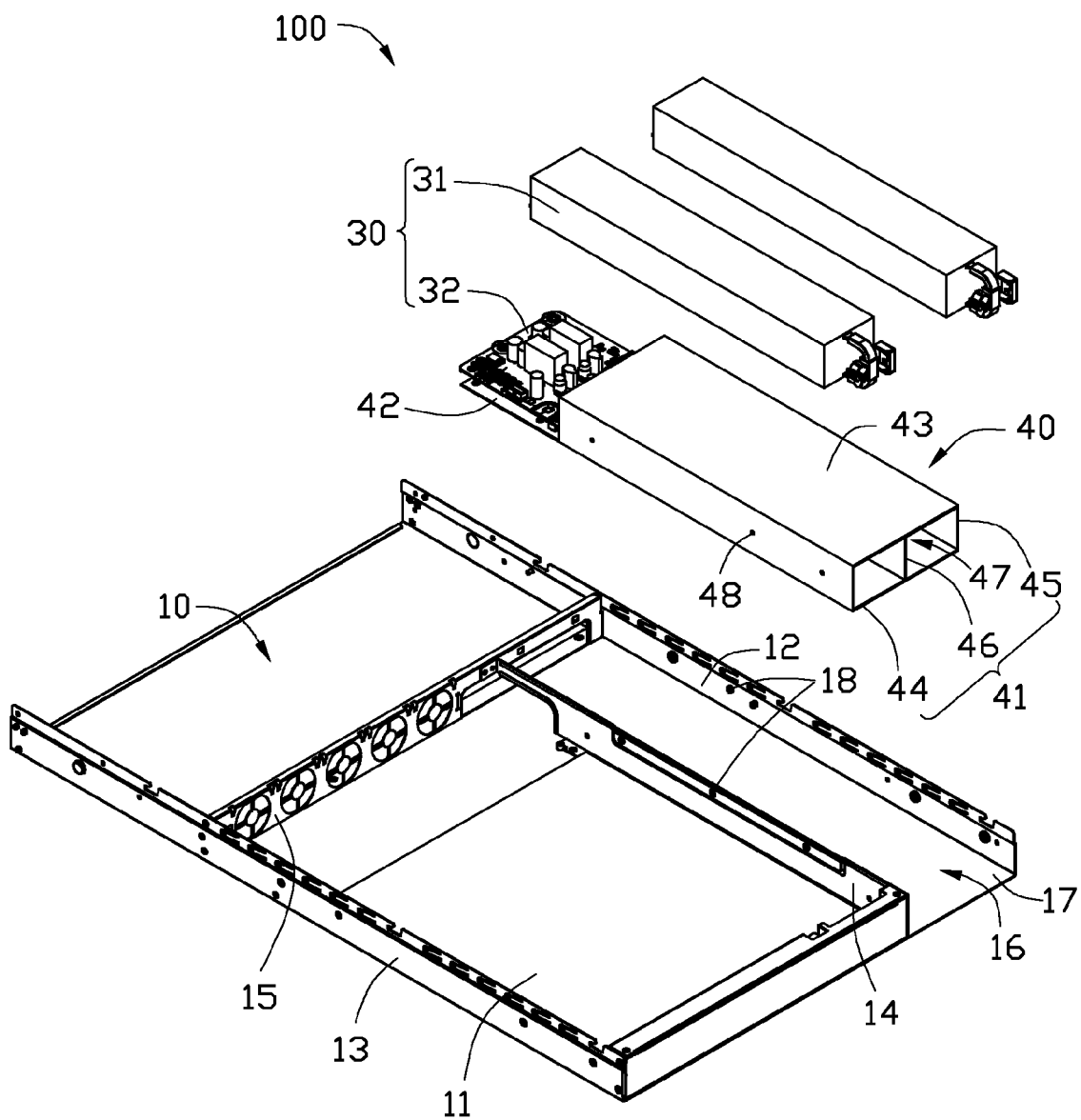
FIG. 2 is an exploded view of FIG. 1.

Referring to FIGS. 1 and 2, a computer case 100 according to an embodiment is shown. The computer case 100 includes a housing 10 for receiving electrical components. The housing 10 includes a bottom wall 11 and two sidewalls 12, 13 extending perpendicularly from two opposite sides of the bottom wall 11. A first fixing wall 14 and a second fixing wall 15 are also extending perpendicularly from the bottom wall 11. The first fixing wall 14 is parallel to the sidewall 12. The second fixing wall 15 perpendicularly intersects the first fixing wall 14. Two ends of the second fixing wall 15 respectively intersect the sidewalls 12, 13. The bottom wall 11, the sidewall 12, and the first and second fixing walls 14, 15 cooperate to form a receiving space 16. The receiving space 16 includes an opening 17 at an edge of the bottom wall 11. A plurality of fixing holes 18 are defined in the sidewall 12 and the fixing wall 14 and communicated with the receiving space 16.

Figure 3:
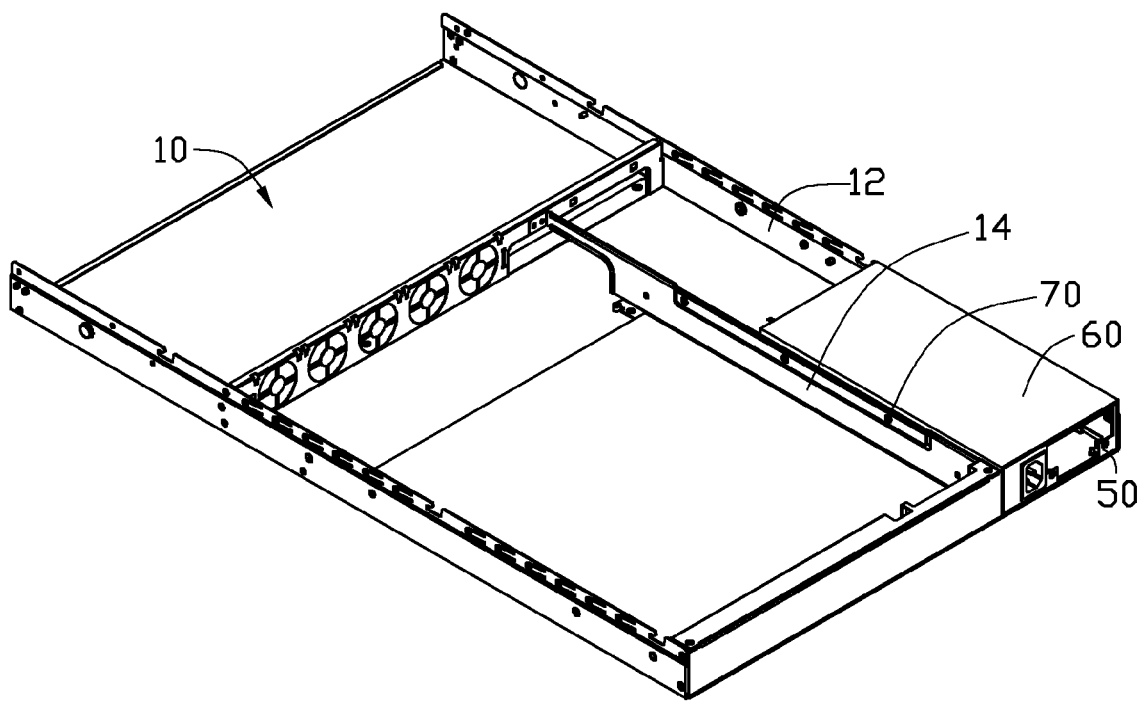
FIG. 3 is a schematic, isometric view of the computer case of FIG. 1 but with a single power supply.
Figure 4:
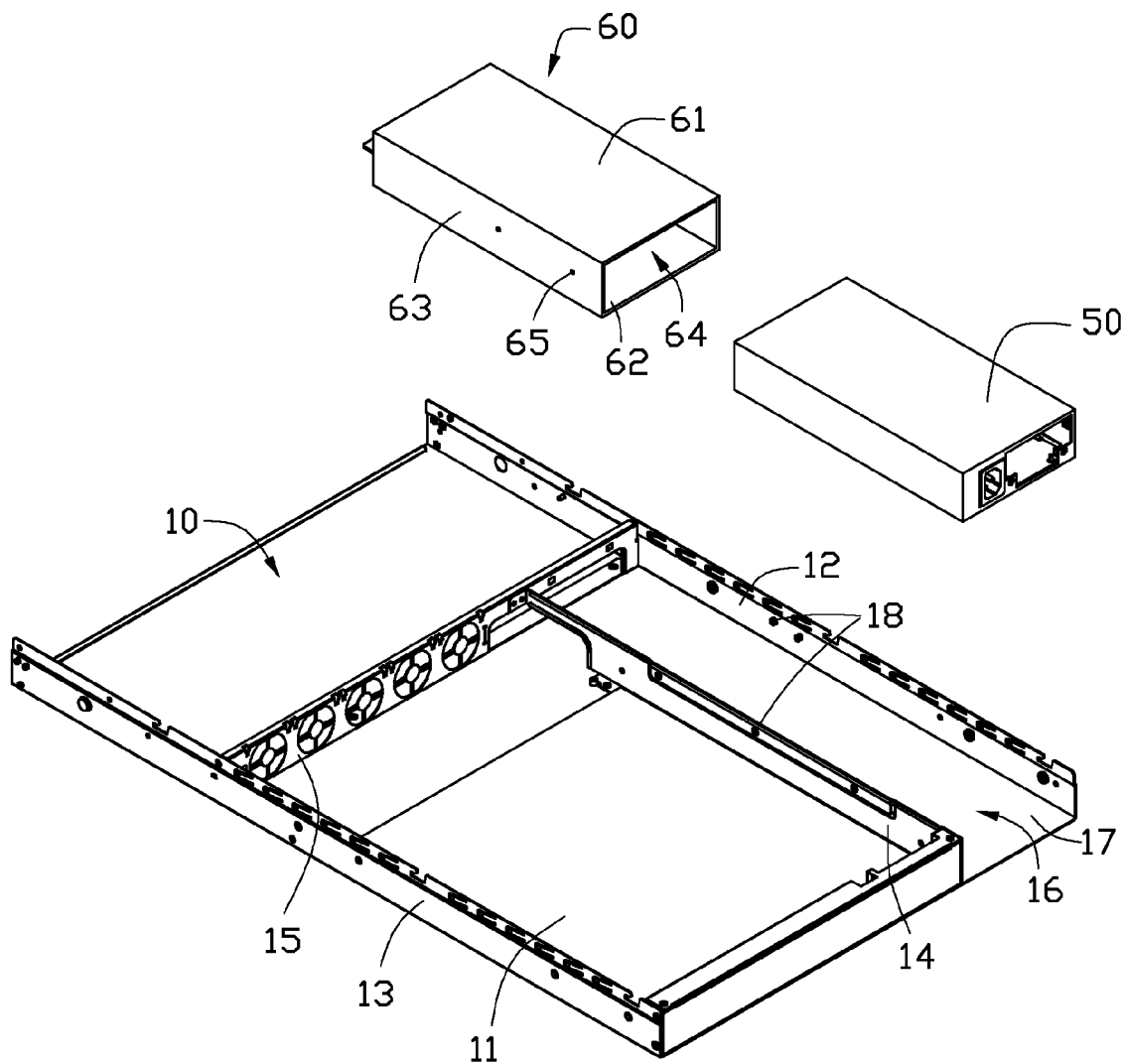
FIG. 4 is an exploded view of FIG. 3.

Referring also to FIGS. 3 and 4, the computer case 100 further includes a first sub housing 40 for receiving a redundant power supply 30, and a second sub housing 60 for receiving a single power supply 50. The width of the first sub housing 40 is equal to the width of the second sub housing 60 and is equal to the width of the receiving space 16, that is, equal to the distance between the sidewall 12 and the first fixing wall 14. The first sub housing 40 is longer than the second sub housing 60, but shorter than or equal to the length of the receiving space 16, that is, shorter than or equal to the distance between the second fixing wall 15 and the opening 17.

The first sub housing 40 includes a box-shaped main body 41 and a support board 42. The box-shaped main body 41 includes a top wall 43, a bottom wall 44, two sidewalls 45 and a middle wall 46 connecting the top wall 43 to the bottom wall 44. The top wall 43, the bottom wall 44, the sidewalls 45, and the middle wall 46 cooperate to form two first sub receiving spaces 47. The first sub receiving spaces 47 are open at two ends. The support board 42 extends from the bottom wall 44 at an open end of the first sub receiving spaces 47, and the two sidewalls 45 define screw holes 48 corresponding to the fixing holes 18.

The redundant power supply 30 includes two power modules 31 and a power distribution module 32. The two power modules 31 are fixed in the two first sub receiving spaces 47 respectively. The power distribution module 32 is fixed on the support board 42. The two power modules 31 are connected to the power distribution module 32 respectively. As the redundant power supply 30 is familiar to those skilled in the art, a detailed description is omitted here.

The second sub housing 60 is box-shaped. The second sub housing 60 includes a top wall 61, a bottom wall 62, and two sidewalls 63 connecting the top wall 61 to the bottom wall 62. The top wall 61, the bottom wall 62, and the sidewalls 63 cooperate to form a second sub receiving space 64. The second sub housing 60 defines screw holes 65 in the sidewalls 63. The second sub receiving space 64 is open at two ends. The single power supply 50 is fixed in the second sub receiving space 64. As the single power supply 50 is familiar to those skilled in the art, a detailed description is omitted here.

Referring to FIGS. 1 and 3, when mounting the redundant power supply 30 received in the first sub housing 40 to the housing 10, the first sub housing 40 is put in the receiving space 16 and with the screw holes 48 aligned with the fixing holes 18. Screws 70 are then extended through the fixing holes 18 and engaged in the screw holes 48, thus fixing the redundant power supply 30 on the housing 10. To replace the redundant power supply 30 with the single power supply 50, the screws 70 are loosened and the first sub housing 40 are removed, and the second sub housing 60 with the single power supply 50 is mounted in the receiving space 16. The screw holes 65 are aligned with the fixing holes 18, and then the screws 70 are inserted into the fixing holes 18 and the screw holes 65 to secure the second sub housing 60 to the housing 10.

It will be understood that the above particular embodiments are shown and described by way of illustration only. The principles and the features of the present disclosure may be employed in various and numerous embodiments thereof without departing from the scope of the disclosure. The above-described embodiments illustrate the scope of the disclosure but do not restrict the scope of the disclosure.

What is claimed is:

1. A computer case, comprising:
   a housing comprising a bottom wall, a sidewall extending perpendicularly from a side of the bottom wall, and a fixing wall extending perpendicularly from the bottom wall, wherein the fixing wall is parallel to the sidewall, all of the bottom wall, the sidewall, and the fixing wall cooperate to define a receiving space;
   a first sub housing configured for receiving a redundant power supply, the first sub housing comprising a first top wall, a first bottom wall, two first sidewalls and a middle wall, the two first sidewalls and the middle wall connecting the first top wall to the first bottom wall, all of the first top wall, the first bottom wall, the two first side walls, and the middle wall cooperating to define two first sub receiving spaces; and
   a second sub housing configured for receiving a single power supply, the second sub housing comprising a second top wall, a second bottom wall, two second sidewalls connecting the second top wall to the second bottom wall, all of the second top wall, the second bottom wall, and the two second sidewalls cooperating to defining a second sub receiving space; wherein a width of the first sub housing is equal to that of the second sub housing and is equal to that of the receiving space, a length of each of the first sub housing and the second sub housing is equal to or shorter than that of the receiving space; and each of the first sub housing and the second sub housing is capable of being detachably received in the receiving space and secured to the housing.

2. The computer case of claim 1, wherein the housing further comprises a second fixing wall extending perpendicularly from the bottom wall, and the second fixing wall perpendicularly intersects the sidewall and the fixing wall.

3. The computer case of claim 1, wherein the first sub housing comprises a box-shaped main body and a support board extending from one end of the box-shaped main body.

4. The computer case of claim 1, wherein each of the two first sub receiving spaces is open at two ends.

5. The computer case of claim 1, wherein the second sub receiving space is open at two ends.

6. The computer case of claim 1, wherein the sidewall and the fixing wall of the housing define fixing holes, each of the first sub housing and the second sub housing defines screw holes spatially corresponding to the fixing holes for allowing screws to extend therethrough to fix the first sub housing or the second sub housing on the housing.

\* \* \* \* \*